United States Patent
Yan et al.

(10) Patent No.: US 12,421,572 B1
(45) Date of Patent: Sep. 23, 2025

(54) SPHERICAL MEDICAL TANTALUM ALLOY POWDER, PREPARATION METHOD THEREFOR AND USE THEREOF

(71) Applicant: Institute of New Materials, Guangdong Academy of Sciences, Guangzhou (CN)

(72) Inventors: Xingchen Yan, Guangzhou (CN); Dongdong Dong, Guangzhou (CN); Jiangqi Zhu, Guangzhou (CN); Bingwen Lu, Guangzhou (CN); Cheng Chang, Guangzhou (CN)

(73) Assignee: Institute of New Materials, Guangdong Academy of Sciences, Guangzhou (CN)

( * ) Notice: Subject to any disclaimer, the term of this patent is extended or adjusted under 35 U.S.C. 154(b) by 0 days.

(21) Appl. No.: 19/008,716

(22) Filed: Jan. 3, 2025

(30) Foreign Application Priority Data

Sep. 3, 2024 (CN) .......................... 202411227044.8

(51) Int. Cl.
*C22C 1/04* (2023.01)
*B22F 1/065* (2022.01)
(Continued)

(52) U.S. Cl.
CPC .............. *C22C 1/045* (2013.01); *B22F 1/065* (2022.01); *C22C 27/02* (2013.01);
(Continued)

(58) Field of Classification Search
CPC ......... C22C 1/045; C22C 27/00; C22C 27/02; B22F 1/05–056
See application file for complete search history.

(56) References Cited

U.S. PATENT DOCUMENTS 11,691,197 B2 * 7/2023 Sungail .................. B33Y 40/10
                                                                                              75/255
12,037,669 B1 * 7/2024 Martin .................... C22C 16/00
(Continued)

FOREIGN PATENT DOCUMENTS

CN       108941537 A   * 12/2018  ............ B22F 1/0048
CN       109014181 A     12/2018
(Continued)

OTHER PUBLICATIONS

Retsch, "Planetary Ball Mill PM 400", https://www.retsch.com/products/milling/ball-mills/planetary-ball-mill-pm-400/, retrieved from internet on Mar. 19, 2025; wayback machine Apr. 10, 2017 (Year: 2017).*

*Primary Examiner* — Sally A Merkling
*Assistant Examiner* — Austin Pollock
(74) *Attorney, Agent, or Firm* — Rondaus PLLC; George Liu

(57) ABSTRACT

The present disclosure provides a spherical medical tantalum alloy powder, a preparation method therefor and a use thereof, the preparation method comprising the following steps: S1. conducting preliminary plasma spheroidization on a pure tantalum powder to obtain a spherical pure tantalum powder; S2. mixing the spherical pure tantalum powder obtained from S1 with a pure copper particle and a pure silver particle, and then subjecting the mixture to a planetary ball milling to obtain a mixed metal powder; and S3. conducting plasma spheroidization on the mixed metal powder obtained in S2, and then sieving and filtering to obtain the spherical medical tantalum alloy powder. In the present disclosure, through the preparation method combining two-stage plasma spheroidization technology with planetary ball milling technology, the burnout of copper and silver can be (Continued)

reduced, and the spheroidization rate of the tantalum alloy powder can be further improved.

5 Claims, 3 Drawing Sheets

(51) Int. Cl.
  *B33Y 70/00*     (2020.01)
  *C22C 27/02*     (2006.01)
(52) U.S. Cl.
  CPC ....... *B22F 2301/20* (2013.01); *B22F 2304/10* (2013.01); *B33Y 70/00* (2014.12)

(56) References Cited

U.S. PATENT DOCUMENTS

| | | | |
|---|---|---|---|
| 2007/0205102 A1* | 9/2007 | Scholl | C23C 14/3407 204/298.12 |
| 2019/0061005 A1* | 2/2019 | Kelkar | B22F 1/065 |
| 2019/0217389 A1* | 7/2019 | Parrish | B33Y 70/00 |
| 2020/0078861 A1 | 3/2020 | Sungail et al. | |
| 2022/0370690 A1* | 11/2022 | Yadov | C22C 27/00 |

FOREIGN PATENT DOCUMENTS

| | | | |
|---|---|---|---|
| CN | 114653959 A | | 6/2022 |
| CN | 114855024 A | | 8/2022 |
| CN | 115747596 A | | 3/2023 |
| CN | 116688229 A | | 9/2023 |
| CN | 117000993 A | | 11/2023 |
| CN | 118422025 A | * | 8/2024 |

* cited by examiner

SPHERICAL MEDICAL TANTALUM ALLOY POWDER, PREPARATION METHOD THEREFOR AND USE THEREOF

TECHNICAL FIELD

The present disclosure relates to the technical field of metal powder materials and preparation, in particular to a spherical medical tantalum alloy powder, a preparation method therefor and a use thereof.

BACKGROUND

Tantalum metal possesses characteristics such as high strength, good plasticity and ductility, high chemical stability, corrosion resistance, high mechanical reliability, and excellent fatigue resistance, making it applicable in a wide range of fields. In the past decade, tantalum, as a "biocompatible" metal, has received extensive attention for its potential in the medical field. Tantalum metal is stable across the entire pH range and maintains very stable chemical properties in the human body's fluid environment. It exhibits strong corrosion resistance, no cytotoxicity, does not release harmful elements, and is not absorbed by the human body, demonstrating excellent cell compatibility and biological stability. Additionally, tantalum has excellent cell adhesion properties, making it an ideal high-performance biomedical metal material. It can be used to manufacture high-end implantable and interventional devices through additive manufacturing and is widely applied in medical fields such as orthopedics, cranio-maxillofacial surgery, oral surgery, and general surgery.

Currently, the preparation methods for tantalum metal powder used in additive manufacturing on the market include radio frequency plasma spheroidization and atomization, electrical explosion atomization, and rotating electrode atomization. The raw material for the radio frequency plasma spheroidization and atomization method is irregular particulate powder. The prepared tantalum powder has high sphericity, uniform composition, and high powder yield. However, the oxygen content of the prepared powder is greatly influenced by the raw material particles, which places high requirements on the raw materials. The electrical explosion atomization method is more suitable for the preparation of micrometer-scale powder, with a conventional high powder yield in the range of 0-10 μm. The powder suitable for 3D printing has a particle size of 15-53 μm. When using the electrical explosion method to prepare particles in the tens of micrometers range, the relative powder yield is low. The rotating electrode atomization method uses rod-shaped materials as raw materials. Its advantage is that the prepared spherical tantalum powder has high sphericity and high powder yield. However, the main particle size range is concentrated in 45-150 μm, with a low content of powder in the 15-53 μm range suitable for 3D printing. At the same time, the electrical explosion atomization method and the rotating electrode atomization method face issues of element burnout and density when preparing tantalum alloy powder.

Chinese patent CN114540689A, "Antibacterial Medical Tantalum Alloy with Ultra-Low Elastic Modulus and Preparation Method Therefor" discloses a method for obtaining tantalum alloy through mechanical alloying and spark plasma sintering. However, this method involves obtaining tantalum alloy powder through conventional ball milling and then directly forming the part through spark plasma sintering, rather than preparing powder suitable for additive manufacturing. Moreover, it still has the problem of element burnout, and its performance needs further improvement.

Therefore, the development of spherical medical tantalum alloy powder with low element burnout, high density, excellent performance, and suitability for additive manufacturing, and preparation method thereof, is of great significance.

SUMMARY

In view of the issues with existing additive manufacturing medical tantalum alloy powders, such as significant element burnout, low density, and the need for further performance improvement, the present disclosure provides a spherical medical tantalum alloy powder and a preparation method thereof. The main component is tantalum, with alloy components of copper and silver, prepared through a specific preparation method. The resulting spherical medical tantalum alloy powder exhibits high tensile strength, yield strength, and excellent biocompatibility. It can be used in the medical field for implantable devices, for the preparation of biomedical implants or scaffolds, and holds significant economic value and promotion significance.

To achieve the above objectives, the technical solution adopted by the present disclosure is as follows:

A method for preparing a spherical medical tantalum alloy powder, comprising the following steps:
  S1. conducting preliminary plasma spheroidization on a pure tantalum powder to obtain a spherical pure tantalum powder;
  S2. mixing the spherical pure tantalum powder obtained from S1 with a pure copper particle and a pure silver particle, and then subjecting the mixture to a planetary ball milling to obtain a mixed metal powder; and
  S3. conducting plasma spheroidization on the mixed metal powder obtained in S2, and then sieving and filtering to obtain the spherical medical tantalum alloy powder.

The present disclosure opts to combine pure tantalum with copper and silver elements to obtain a tantalum alloy powder, endowing the alloy with excellent antibacterial properties. The spherical medical tantalum alloy powder of the present disclosure not only exhibits superior cell compatibility and biological stability but also possesses notable antibacterial performance. It is expected to reduce the incidence of infection in surrounding tissues during the clinical use of tantalum alloy implants made from this spherical medical tantalum alloy powder, thereby enhancing medical efficacy and clinical success rates.

The present disclosure initially subjects pure tantalum powder to preliminary plasma spheroidization, followed by mixing with pure copper particles and pure silver particles through planetary ball milling to thoroughly blend the alloy powder. Subsequently, the mixed metal powder is plasma-spheroidized to obtain the spherical medical tantalum alloy powder. This process fully leverages the advantages of radio-frequency plasma spheroidization and atomization, including rapid heating and cooling, short sintering time, high density, and a clean preparation process. These benefits help to mitigate composition segregation and structural inhomogeneity in the alloy and reduce manufacturing costs. By first plasma-spheroidizing the pure tantalum powder to achieve a certain degree of spheroidization, it becomes easier to control the power during the subsequent secondary plasma spheroidization of the mixed metal powder to obtain the formed powder, thereby minimizing the burnout of copper and silver. Planetary ball milling is used to further enhance the spheroidization rate of the tantalum alloy powder by mixing pure tantalum with pure copper and silver particles, and to coat the copper and silver onto the tantalum powder, improving the density of the spherical medical tantalum alloy powder. Finally, through secondary plasma spheroidization, a spherical medical tantalum alloy powder with low element burnout, high density, and suitability for additive manufacturing is obtained. This powder features high sphericity, with few non-conforming spheres such as irregular particles or satellite powders, and exhibits excellent biocompatibility.

Further, a particle size of the pure tantalum powder in S1 is ≤200 μm.

The present disclosure preferably selects pure tantalum powder with a particle size range of ≤200 μm, which facilitates the subsequent combination of two-stage plasma spheroidization technology with planetary ball milling technology to obtain spherical medical tantalum alloy powder with a particle size range of 15-53 μm, suitable for 3D printing.

Further, process parameters for the preliminary plasma spheroidization in S1 and the plasma spheroidization in S3 are independently: a powder feed rate of 10-20 g·min$^{-1}$, a carrier gas flow rate of a protective gas of 5-15 L/min, a central gas flow rate of 15-25 L/min, a sheath gas flow rate of 50-80 L/min, a grid current of 0.2-0.6 A, a plate voltage of 5-15 kV, and a plate current of 2-6 A.

The preferred plasma spheroidization process parameters of the present disclosure are as follows: a powder feed rate of 10-20 g min$^{-1}$, a carrier gas flow rate of a protective gas of 5-15 L/min, a central gas flow rate of 15-25 L/min, a sheath gas flow rate of 50-80 L/min, a grid current of 0.2-0.6 A, a plate voltage of 5-15 kV, and a plate current of 2-6 A. By controlling the powder feed rate, carrier gas flow rate, grid current, plate voltage, and plate current, the porosity and element burnout rate of the spherical medical tantalum alloy powder are further reduced, and the density is increased even more. This results in a spherical medical tantalum alloy powder with even less element burnout, higher density, and suitability for additive manufacturing. The obtained spherical medical tantalum alloy powder exhibits higher sphericity and minimal non-conforming spheres such as irregular particles or satellite powders.

Further, process parameters for the preliminary plasma spheroidization in S1 and the plasma spheroidization in S3 are independently: the powder feed rate of 10 g·min$^{-1}$, the carrier gas flow rate of the protective gas of 15 L/min, the central gas flow rate of 20 L/min, the sheath gas flow rate of 65 L/min, the grid current of 0.3 A, the plate voltage of 5 kV, and the plate current of 2.5 A, wherein the protective gas, the central gas and the sheath gas are Ar.

Further, a particle size of the pure copper particle in S2 is 10-100 nm; and a particle size of the pure silver particle is 10-100 nm.

The present disclosure preferably selects pure copper particles and pure silver particles with a particle size range of 10-100 nm, facilitating the coating of copper and silver onto the tantalum powder in planetary ball milling. Through the combination of two-stage plasma spheroidization technology and planetary ball milling technology, a spherical medical tantalum alloy powder with a particle size range of 15-53 μm, suitable for 3D printing, is obtained.

Further, a rotation speed of a main turntable for the planetary ball milling in S2 is 50-200 r/min, and a rotation speed of a ball milling jar is 50-400 r/min.

The present disclosure preferably selects planetary ball milling process parameters with a main turntable rotation speed of 50-200 r/min and a ball mill jar rotation speed of 50-400 r/min. By controlling the ball milling speed, the pure tantalum powder is thoroughly and uniformly mixed with the pure copper particles and pure silver particles. During the ball milling process, a series of plastic deformations occur, resulting in the refinement of the powder and an increase in flaky, large-particle powders. This facilitates a more uniform coating of copper and silver onto the tantalum powder, yielding a spherical medical tantalum alloy powder with a more uniform composition and superior performance.

Furthermore, a rotation speed of a main turntable for the planetary ball milling in S2 is 100 r/min, and a rotation speed of a ball milling jar is 200 r/min.

Another objective of the present disclosure is to provide a spherical medical tantalum alloy powder.

A spherical medical tantalum alloy powder prepared by the preparation method described in any one of the preceding claims.

Further, the spherical medical tantalum alloy powder comprises following metal elements in weight percentage: Ta: 89-98.9%, Ag: 0.1-1%, and Cu: 1-10%.

The present disclosure preferably selects an elemental composition ratio of Ta: 89-98.9%, Ag: 0.1-1%, and Cu: 1-10%, where the weight of Cu is approximately 5-10 times that of Ag. By controlling the elemental composition ratio of pure tantalum, copper, and silver, it ensures that trace amounts of copper ions and silver ions can be released persistently from the surface of the spherical medical tantalum alloy powder, thereby endowing the spherical medical tantalum alloy powder with continuous and excellent antibacterial properties. At the same time, it also ensures that the spherical medical tantalum alloy powder does not release excessive amounts of copper ions or silver ions, which could otherwise affect the corrosion resistance and biosafety of the spherical medical tantalum alloy powder.

Further, a particle size of the spherical medical tantalum alloy powder is 15-53 μm.

Another objective of the present disclosure is to provide a use of spherical medical tantalum alloy powder.

The spherical medical tantalum alloy powder as described above is used for additive manufacturing.

Compared with the prior art, the present disclosure offers the following advantages and beneficial effects:

The spherical medical tantalum alloy powder of the present disclosure differs from pure tantalum powder in that the tantalum alloy contains silver and copper, which have melting points far different from that of tantalum. If the spherical medical tantalum alloy powder is prepared by rotating electrode atomization, on the one hand, the process requires prior melting of the tantalum-silver-copper alloy and processing it into rod form, which not only adds an extra melting step but also prolongs the overall powder production process due to the extended melting cycle, while significantly increasing production costs. On the other hand, during the rotating electrode atomization process, to obtain tantalum alloy powder with high sphericity, the alloy must be completely melted and ejected. At the temperature required to melt tantalum, significant burnout and evaporation of silver and copper will inevitably occur, seriously affecting the compositional accuracy and density of the powder particles.

If the spherical medical tantalum alloy powder is prepared by the electrical explosion method, firstly, it also involves the additional step of melting and preparing the required wire or rod material, with the raw material typically being fine metal wire, which is difficult to process. Secondly, the electrical explosion method utilizes pre-stored electrical energy to pulse-discharge a metal conductor (such as a conductor wire or foil). The high-current pulse causes the metal conductor to melt, vaporize, expand, and explode into powder. However, at the temperature required to melt tantalum, significant burnout and evaporation of silver and copper still occur, seriously affecting the compositional accuracy and density of the powder particles. Lastly, the metal powder produced by the electrical explosion method has small particle size, large specific surface area, high reactivity, and is difficult to collect.

After repeated research, the inventor creatively developed the combination of two-stage plasma spheroidization technology and planetary ball milling technology used in the present disclosure. Through preliminary plasma spheroidization, pure tantalum powder with a certain degree of spheroidization is obtained. This is then mixed with pure copper particles and pure silver particles through planetary ball milling to thoroughly blend the alloy powder. Finally, the mixed metal powder is subjected to plasma spheroidization to obtain the spherical medical tantalum alloy powder. By controlling the power of the plasma spheroidization, the burnout of copper and silver can be reduced, and the spheroidization rate of the tantalum alloy powder can be further improved. Additionally, copper and silver are coated onto the surface of the tantalum powder, resulting in a spherical medical tantalum alloy powder with low element burnout, high density, and suitability for additive manufacturing. This powder has high sphericity, with minimal non-conforming spheres such as irregular particles or satellite powders, and excellent biocompatibility, making it suitable for medical applications. It holds significant economic value and promotion significance.

BRIEF DESCRIPTION OF THE DRAWINGS

Further explanation of the present disclosure is provided using the accompanying drawings, but the embodiments shown in the drawings do not constitute any limitation on the present disclosure. For a person of ordinary skill in the art, without inventive effort, other drawings can also be obtained based on the following drawings.

DETAILED DESCRIPTION OF THE EMBODIMENTS

Figure 1:
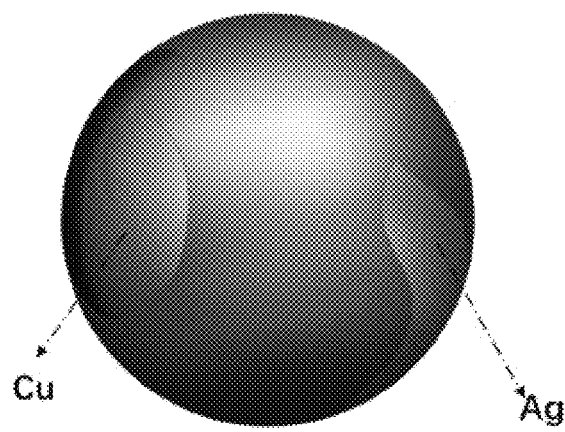
FIG. 1 is a schematic diagram of the tantalum alloy powder prepared by the present disclosure.

To better illustrate the purpose, technical solutions, and advantages of the present disclosure, the following embodiments are provided for further explanation. It is evident that these embodiments represent only a portion of the embodiments of the present disclosure, rather than all of them; it should be understood that the embodiments are intended solely to demonstrate the technical effects of the present disclosure and are not intended to limit the scope of protection of the present disclosure.

All raw materials used in the embodiments are all commercially available; unless otherwise specified, the reagents, methods, and equipment employed in the present disclosure are conventional in the technical field.

Embodiment 1

A method for preparing a spherical medical tantalum alloy powder, comprising the following steps:

The spherical medical tantalum alloy powder comprises following metal elements in weight percentage: 94.5% Ta, 0.5% Ag, and 5% Cu.

S1. Conducting preliminary plasma spheroidization on pure tantalum powder with a particle size of ≤200 μm, wherein the powder feed rate is 15 g·min$^{-1}$, the carrier gas flow rate of the protective gas Ar is 15 L/min, the central gas Ar flow rate is 20 L/min, the sheath gas Ar flow rate is 65 L/min, the grid current is 0.4 A, the plate voltage is 7 kV, and the plate current is 3.5 A, to obtain spherical pure tantalum powder.

S2. Mixing the spherical pure tantalum powder obtained from S1 with pure copper particles and pure silver particles, both having a particle size range of 10-100 nm, and then performing planetary ball milling at a main turntable rotation speed of 100 r/min and a ball milling jar rotation speed of 200 r/min to obtain mixed metal powder.

S3. Conducting plasma spheroidization on the mixed metal powder obtained from S2, wherein the powder feed rate is 10 g min$^{-1}$, the carrier gas flow rate of the protective gas Ar is 15 L/min, the central gas Ar flow rate is 20 L/min, the sheath gas Ar flow rate is 65 L/min, the grid current is 0.3 A, the plate voltage is 5 kV, and the plate current is 2.5 A, and then sieving and filtering the powder to collect tantalum alloy powder with a particle size range of 15-53 μm, thus obtaining the spherical medical tantalum alloy powder.

Embodiment 2

A method for preparing a spherical medical tantalum alloy powder, comprising the following steps:

The spherical medical tantalum alloy powder comprises following metal elements in weight percentage: 98.9% Ta, 0.1% Ag, and 1% Cu.

S1. Conducting preliminary plasma spheroidization on pure tantalum powder with a particle size of ≤200 μm, wherein the powder feed rate is 18 g·min$^{-1}$, the carrier gas flow rate of the protective gas Ar is 15 L/min, the central gas Ar flow rate is 20 L/min, the sheath gas Ar flow rate is 65 L/min, the grid current is 0.4 A, the plate voltage is 7 kV, and the plate current is 3.5 A, to obtain spherical pure tantalum powder.

S2. Mixing the spherical pure tantalum powder obtained from S1 with pure copper particles and pure silver particles, both having a particle size range of 10-100 nm, and then performing planetary ball milling at a main turntable rotation speed of 100 r/min and a ball milling jar rotation speed of 200 r/min to obtain mixed metal powder.

S3. Conducting plasma spheroidization on the mixed metal powder obtained from S2, wherein the powder feed rate is 10 g min$^{-1}$, the carrier gas flow rate of the protective gas Ar is 15 L/min, the central gas Ar flow rate is 20 L/min, the sheath gas Ar flow rate is 65 L/min, the grid current is 0.3 A, the plate voltage is 5 kV, and the plate current is 2.5 A, and then sieving and filtering the powder to collect tantalum alloy powder with a particle size range of 15-53 μm, thus obtaining the spherical medical tantalum alloy powder.

Embodiment 3

A method for preparing a spherical medical tantalum alloy powder, comprising the following steps:

The spherical medical tantalum alloy powder comprises following metal elements in weight percentage: 89% Ta, 1% Ag, and 10% Cu.

S1. Conducting preliminary plasma spheroidization on pure tantalum powder with a particle size of ≤200 μm, wherein the powder feed rate is 20 g min$^{-1}$, the carrier gas flow rate of the protective gas Ar is 15 L/min, the central gas Ar flow rate is 20 L/min, the sheath gas Ar flow rate is 65 L/min, the grid current is 0.4 A, the plate voltage is 7 kV, and the plate current is 3.5 A, to obtain spherical pure tantalum powder.

S2. Mixing the spherical pure tantalum powder obtained from S1 with pure copper particles and pure silver particles, both having a particle size range of 10-100 nm, and then performing planetary ball milling at a main turntable rotation speed of 100 r/min and a ball milling jar rotation speed of 200 r/min to obtain mixed metal powder.

S3. Conducting plasma spheroidization on the mixed metal powder obtained from S2, wherein the powder feed rate is 10 g·min$^{-1}$, the carrier gas flow rate of the protective gas Ar is 15 L/min, the central gas Ar flow rate is 20 L/min, the sheath gas Ar flow rate is 65 L/min, the grid current is 0.3 A, the plate voltage is 5 kV, and the plate current is 2.5 A, and then sieving and filtering the powder to collect tantalum alloy powder with a particle size range of 15-53 μm, thus obtaining the spherical medical tantalum alloy powder.

Embodiment 4

A method for preparing a spherical medical tantalum alloy powder, comprising the following steps:

The spherical medical tantalum alloy powder comprises following metal elements in weight percentage: 94.5% Ta, 0.5% Ag, and 5% Cu.

S1. Conducting preliminary plasma spheroidization on pure tantalum powder with a particle size of ≤200 μm, wherein the powder feed rate is 10 g·min$^{-1}$, the carrier gas flow rate of the protective gas Ar is 5 L/min, the central gas Ar flow rate is 15 L/min, the sheath gas Ar flow rate is 50 L/min, the grid current is 0.2 A, the plate voltage is 5 kV, and the plate current is 2 A, to obtain spherical pure tantalum powder.

S2. Mixing the spherical pure tantalum powder obtained from S1 with pure copper particles and pure silver particles, both having a particle size range of 10-100 nm, and then performing planetary ball milling at a main turntable rotation speed of 50 r/min and a ball milling jar rotation speed of 50 r/min to obtain mixed metal powder.

S3. Conducting plasma spheroidization on the mixed metal powder obtained from S2, wherein the powder feed rate is 10 g·min$^{-1}$, the carrier gas flow rate of the protective gas Ar is 5 L/min, the central gas Ar flow rate is 15 L/min, the sheath gas Ar flow rate is 50 L/min, the grid current is 0.2 A, the plate voltage is 5 kV, and the plate current is 2 A, and then sieving and filtering the powder to collect tantalum alloy powder with a particle size range of 15-53 μm, thus obtaining the spherical medical tantalum alloy powder.

Embodiment 5

A method for preparing a spherical medical tantalum alloy powder, comprising the following steps:

The spherical medical tantalum alloy powder comprises following metal elements in weight percentage: 94.5% Ta, 0.5% Ag, and 5% Cu.

S1. Conducting preliminary plasma spheroidization on pure tantalum powder with a particle size of ≤200 μm, wherein the powder feed rate is 20 g min$^{-1}$, the carrier gas flow rate of the protective gas Ar is 15 L/min, the central gas Ar flow rate is 25 L/min, the sheath gas Ar flow rate is 80 L/min, the grid current is 0.6 A, the plate voltage is 15 kV, and the plate current is 6 A, to obtain spherical pure tantalum powder.

S2. Mixing the spherical pure tantalum powder obtained from S1 with pure copper particles and pure silver particles, both having a particle size range of 10-100 nm, and then performing planetary ball milling at a main turntable rotation speed of 200 r/min and a ball milling jar rotation speed of 400 r/min to obtain mixed metal powder.

S3. Conducting plasma spheroidization on the mixed metal powder obtained from S2, wherein the powder feed rate is 20 g·min$^{-1}$, the carrier gas flow rate of the protective gas Ar is 15 L/min, the central gas Ar flow rate is 25 L/min, the sheath gas Ar flow rate is 80 L/min, the grid current is 0.6 A, the plate voltage is 15 kV, and the plate current is 6 A, and then sieving and filtering the powder to collect tantalum alloy powder with a particle size range of 15-53 μm, thus obtaining the spherical medical tantalum alloy powder.

Embodiment 6

A method for preparing a spherical medical tantalum alloy powder, comprising the following steps:

The spherical medical tantalum alloy powder comprises following metal elements in weight percentage: 94.5% Ta, 0.5% Ag, and 5% Cu.

S1. Conducting preliminary plasma spheroidization on pure tantalum powder with a particle size of ≤200 μm, wherein the powder feed rate is 10 g min$^{-1}$, the carrier gas flow rate of the protective gas Ar is 5 L/min, the central gas Ar flow rate is 15 L/min, the sheath gas Ar flow rate is 50 L/min, the grid current is 0.2 A, the plate voltage is 5 kV, and the plate current is 2 A, to obtain spherical pure tantalum powder.

S2. Mixing the spherical pure tantalum powder obtained from S1 with pure copper particles and pure silver particles, both having a particle size range of 10-100 nm, and then performing planetary ball milling at a main turntable rotation speed of 100 r/min and a ball milling jar rotation speed of 200 r/min to obtain mixed metal powder.

S3. Conducting plasma spheroidization on the mixed metal powder obtained from S2, wherein the powder feed rate is 20 g min$^{-1}$, the carrier gas flow rate of the protective gas Ar is 15 L/min, the central gas Ar flow rate is 25 L/min, the sheath gas Ar flow rate is 80 L/min, the grid current is 0.6 A, the plate voltage is 15 kV, and the plate current is 6 A, and then sieving and filtering the powder to collect tantalum alloy powder with a particle size range of 15-53 μm, thus obtaining the spherical medical tantalum alloy powder.

Embodiment 7

A method for preparing a spherical medical tantalum alloy powder, comprising the following steps:

The spherical medical tantalum alloy powder comprises following metal elements in weight percentage: 94.5% Ta, 0.5% Ag, and 5% Cu.

S1. Conducting preliminary plasma spheroidization on pure tantalum powder with a particle size of ≤200 μm, wherein the powder feed rate is 20 g min$^{-1}$, the carrier gas flow rate of the protective gas Ar is 15 L/min, the central gas Ar flow rate is 25 L/min, the sheath gas Ar flow rate is 80 L/min, the grid current is 0.6 A, the plate voltage is 15 kV, the plate current is 2 A, to obtain spherical pure tantalum powder.

S2. Mixing the spherical pure tantalum powder obtained from S1 with pure copper particles and pure silver particles, both having a particle size range of 10-100 nm, and then performing planetary ball milling at a main turntable rotation speed of 100 r/min and a ball milling jar rotation speed of 200 r/min to obtain mixed metal powder.

S3. Conducting plasma spheroidization on the mixed metal powder obtained from S2, wherein the powder feed rate is 10 g·min$^{-1}$, the carrier gas flow rate of the protective gas Ar is 5 L/min, the central gas Ar flow rate is 15 L/min, the sheath gas Ar flow rate is 50 L/min, the grid current is 0.2 A, the plate voltage is 5 kV, and the plate current is 2 A, and then sieving and filtering the powder to collect tantalum alloy powder with a particle size range of 15-53 μm, thus obtaining the spherical medical tantalum alloy powder.

Comparative Embodiment 1

A method for preparing a spherical medical tantalum alloy powder, comprising the following steps:

The spherical medical tantalum alloy powder comprises following metal elements in weight percentage: 94.5% Ta, 0.5% Ag, and 5% Cu.

S1. Conducting preliminary plasma spheroidization on pure tantalum powder with a particle size of ≤200 μm, wherein the powder feed rate is 15 g min$^{-1}$, the carrier gas flow rate of the protective gas Ar is 15 L/min, the central gas Ar flow rate is 20 L/min, the sheath gas Ar flow rate is 65 L/min, the grid current is 0.4 A, the plate voltage is 7 kV, and the plate current is 3.5 A, to obtain spherical pure tantalum powder.

S2. Mixing the spherical pure tantalum powder obtained from S1 with pure copper particles and pure silver particles, both having a particle size range of 10-100 nm, and then performing planetary ball milling at a main turntable rotation speed of 100 r/min and a ball milling jar rotation speed of 200 r/min to obtain mixed metal powder.

S3. Conducting plasma spheroidization on the mixed metal powder obtained from S2, wherein the powder feed rate is 25 g min$^{-1}$, the carrier gas flow rate of the protective gas Ar is 15 L/min, the central gas Ar flow rate is 20 L/min, the sheath gas Ar flow rate is 65 L/min, the grid current is 0.3 A, the plate voltage is 5 kV, and the plate current is 2.5 A, and then sieving and filtering the powder to collect tantalum alloy powder with a particle size range of 15-53 μm, thus obtaining the spherical medical tantalum alloy powder.

Compared to Embodiment 1, the powder feed rate in S3 of this comparative embodiment is 25 g min$^{-1}$.

Comparative Embodiment 2

A method for preparing a spherical medical tantalum alloy powder, comprising the following steps:

The spherical medical tantalum alloy powder comprises following metal elements in weight percentage: 90% Ta, and 10% Cu.

S1. Conducting preliminary plasma spheroidization on pure tantalum powder with a particle size of ≤200 μm, wherein the powder feed rate is 15 g·min$^{-1}$, the carrier gas flow rate of the protective gas Ar is 15 L/min, the central gas Ar flow rate is 20 L/min, the sheath gas Ar flow rate is 65 L/min, the grid current is 0.4 A, the plate voltage is 7 kV, and the plate current is 3.5 A, to obtain spherical pure tantalum powder.

S2. Mixing the spherical pure tantalum powder obtained from S1 with pure copper particles and pure silver particles, both having a particle size range of 10-100 nm, and then performing planetary ball milling at a main turntable rotation speed of 100 r/min and a ball milling jar rotation speed of 200 r/min to obtain mixed metal powder.

S3. Conducting plasma spheroidization on the mixed metal powder obtained from S2, wherein the powder feed rate is 10 g. min$^{-1}$, the carrier gas flow rate of the protective gas Ar is 15 L/min, the central gas Ar flow rate is 20 L/min, the sheath gas Ar flow rate is 65 L/min, the grid current is 0.3 A, the plate voltage is 5 kV, and the plate current is 2.5 A, and then sieving and filtering the powder to collect tantalum alloy powder with a particle size range of 15-53 μm, thus obtaining the spherical medical tantalum alloy powder.

Compared to Embodiment 1, the alloy element content in this comparative embodiment is: 90% Ta, 10% Cu.

Figure 2:
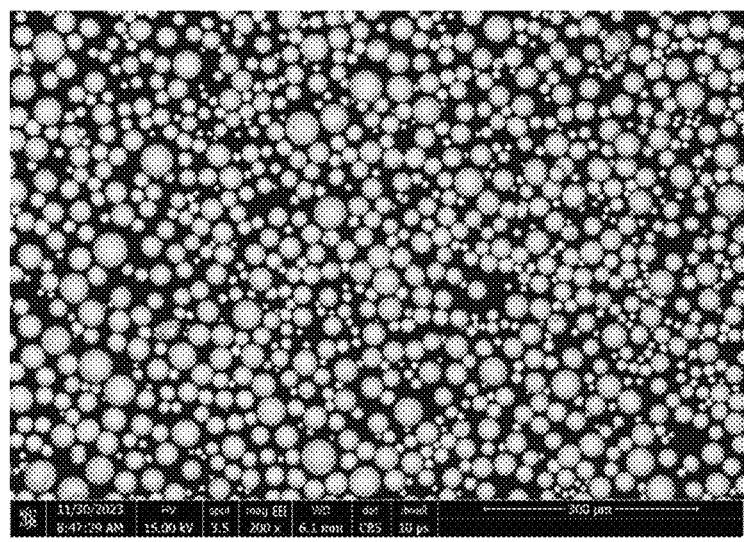
FIG. 2 is an Scanning Electron Microscope (SEM) image of Embodiment 1 of the present disclosure.
Figure 3:
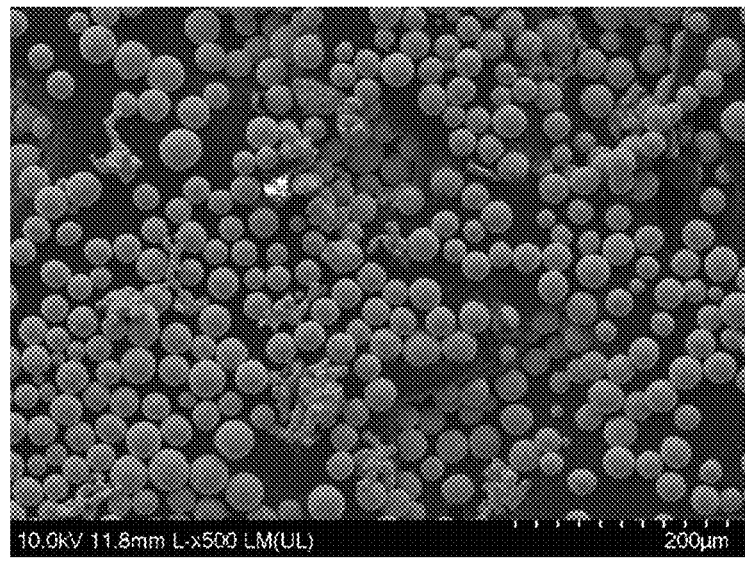
FIG. 3 is an SEM image of Comparative Embodiment 1 of the present disclosure.

Microstructural analysis was conducted on Embodiment 1 and Comparative Embodiment 1, with the corresponding SEM images presented in FIG. 2 and FIG. 3. The images reveal that the spherical medical tantalum alloy powder prepared using the preparation method of the present disclosure exhibits high sphericity, showing minimal presence of non-conforming spheres such as irregular particles or satellite powders. The test results for the other embodiments were largely consistent. However, in Comparative Embodiment 1, due to an excessively high powder feed rate, some particles could not be adequately spheroidized in a timely manner. The powder spray was too dense, causing some molten metal droplets to adhere to surrounding particles or solidify directly in an irregular shape, resulting in lower sphericity and affecting the product yield.

Figure 4:
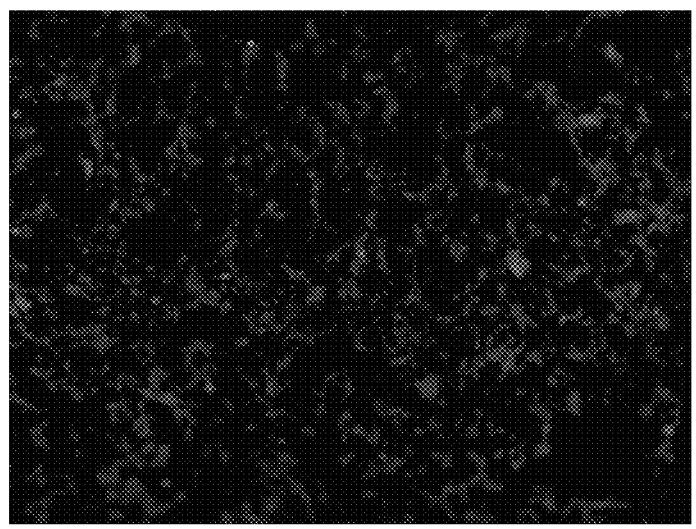
FIG. 4 is a fluorescence microscope image of cell staining for the sample prepared in Embodiment 1 of the present disclosure.
Figure 5:
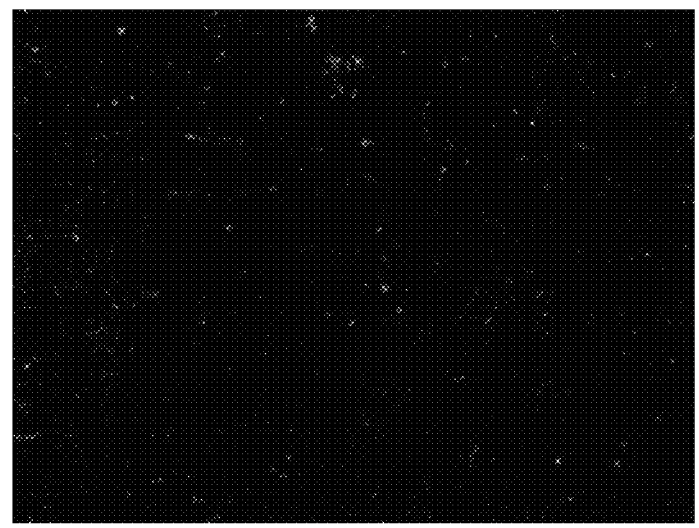
FIG. 5 is a fluorescence microscope image of cell staining for the sample prepared in Comparative Embodiment 2 of the present disclosure.

Laser 3D printing was performed on the samples prepared in Embodiment 1 and Comparative Embodiment 2, followed by cell toxicity testing on the resulting prints. The fluorescent microscope images of cell staining are shown in FIG. 4 and FIG. 5, respectively. As observed in FIG. 4, the cell tissue is clearly stained within the microscope's field of view, and the cells are evenly and densely distributed, indicating that the samples prepared using the spherical medical tantalum alloy powder of the present disclosure exhibit good biological activity. In contrast, FIG. 5 reveals almost no live cells stained within the microscope's field of view, suggesting that the tantalum alloy powder in Comparative Embodiment 2, which simply added copper, exhibits certain cytotoxicity and disrupts the normal cultivation of cells.

In summary, the present disclosure employs a preparation method that combines the two-stage plasma spheroidization technology with planetary ball milling technology. Through preliminary plasma spheroidization, pure tantalum powder with a certain degree of spheroidization is obtained. This is then mixed with pure copper particles and pure silver particles through planetary ball milling to thoroughly blend the alloy powder. Finally, the mixed metal powder is subjected to plasma spheroidization. By controlling the power of the spheroidization, the burnout of copper and silver can be reduced, and the spheroidization rate of the tantalum alloy powder can be further improved. Additionally, copper and silver are coated onto the surface of the tantalum powder, resulting in the spherical medical tantalum alloy powder with low element burnout, high density, and suitability for additive manufacturing. This powder has high sphericity, with minimal non-conforming spheres such as irregular particles or satellite powders, and excellent biocompatibility, making it suitable for medical applications. It holds significant economic value and promotion significance.

Finally, it should be noted that the above embodiments are only used to illustrate the technical solution of the present disclosure rather than limit the protection scope of the present disclosure. Although the present disclosure is described in detail with reference to the preferred embodiments, a person of ordinary skill in the art should understand that the technical solutions of the present disclosure can be modified or equivalently replaced, but do not depart from the spirit and scope of the technical solutions of the present disclosure.

What is claimed is:

1. A method for preparing a spherical medical tantalum alloy powder, comprising the following steps:
   S1. conducting preliminary plasma spheroidization on a pure tantalum powder to obtain a spherical pure tantalum powder;
   S2. mixing the spherical pure tantalum powder obtained from S1 with a pure copper particle and a pure silver particle, and then subjecting the mixture to a planetary ball milling to obtain a mixed metal powder; and
   S3. conducting plasma spheroidization on the mixed metal powder obtained in S2 such that a surface of the pure tantalum powder is coated with copper and silver, and then sieving and filtering to obtain the spherical medical tantalum alloy powder;
   wherein process parameters for the preliminary plasma spheroidization in S1 and the plasma spheroidization in S3 are independently: a powder feed rate of 10-20 g·min$^{-1}$, a carrier gas flow rate of a protective gas of 5-15 L/min, a central gas flow rate of 15-25 L/min, a sheath gas flow rate of 50-80 L/min, a grid current of 0.2-0.6 A, a plate voltage of 5-15 kV, and a plate current of 2-6 A,
   wherein the spherical medical tantalum alloy powder comprises: in weight percentage, 89-98.9% of Ta, 0.1-1% of Ag, and 1-10% of Cu.

2. The method for preparing the spherical medical tantalum alloy powder according to claim 1, wherein a particle size of the pure tantalum powder in S1 is ≤200 μm.

3. The method for preparing the spherical medical tantalum alloy powder according to claim 1, wherein process parameters for the preliminary plasma spheroidization in S1 and the plasma spheroidization in S3 are independent: the powder feed rate of 10 g·min$^{-1}$, the carrier gas flow rate of the protective gas of 15 L/min, the central gas flow rate of 20 L/min, the sheath gas flow rate of 65 L/min, the grid current of 0.3 A, the plate voltage of 5 kV, and the plate current of 2.5 A, wherein the protective gas, the central gas and the sheath gas are Ar.

4. The method for preparing the spherical medical tantalum alloy powder according to claim 1, wherein a particle size of the pure copper particle in S2 is 10-100 nm; and a particle size of the pure silver particle is 10-100 nm.

5. The method for preparing the spherical medical tantalum alloy powder according to claim 1, wherein a rotation speed of a main turntable for the planetary ball milling in S2 is 50-200 r/min, and a rotation speed of a ball milling jar is 50-400 r/min.

* * * * *